May 13, 1941.  C. C. LEADER  2,242,008

DYNAMOELECTRIC MACHINE

Filed Oct. 25, 1939

Inventor:
Charles C. Leader,
by Harry E. Dunham
His Attorney.

UNITED STATES PATENT OFFICE 2,242,008

DYNAMOELECTRIC MACHINE

Charles C. Leader, Schenectady, N. Y., assignor to General Electric Company, a corporation of New York Application October 25, 1939, Serial No. 301,201

11 Claims. (Cl. 172—120)

My invention relates to improvements in dynamoelectric machines, and particularly to the type machine utilizing a multiple section winding in one of the elements thereof.

An object of my invention is to provide a dynamoelectric machine having an improved multiple section winding.

Another object of my invention is to provide an improved dynamoelectric machine having a multiple section winding slot with a relatively large and a relatively small conductor section in each slot and wherein the larger section of the winding slot is continuous longitudinally of the machine and the smaller section of the slot is not continuous longitudinally of the machine.

Further objects and advantages of my invention will become apparent and my invention will be better understood from the following description referring to the accompanying drawing, and the features of novelty which characterize my invention will be pointed out with particularity in the claims annexed to and forming a part of this specification.

Figure 1:
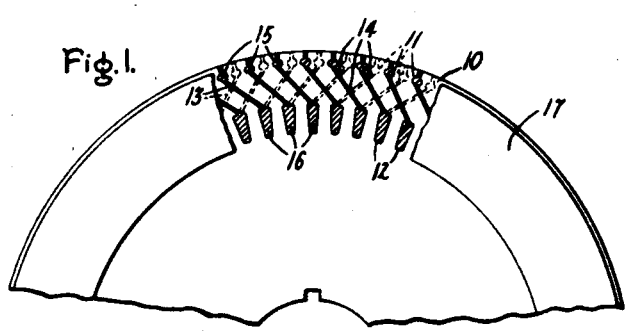
Figure 2:
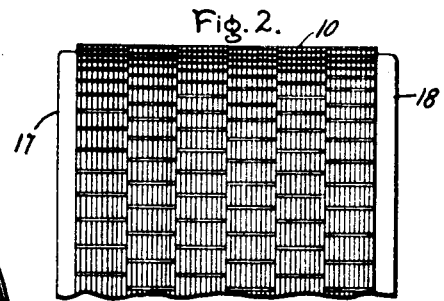
Figure 3:
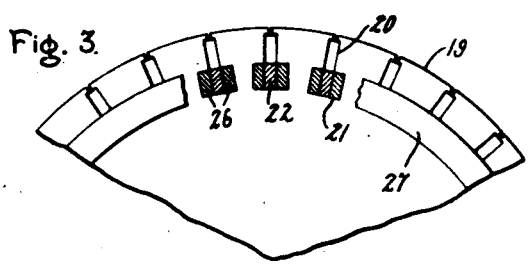
Figure 4:
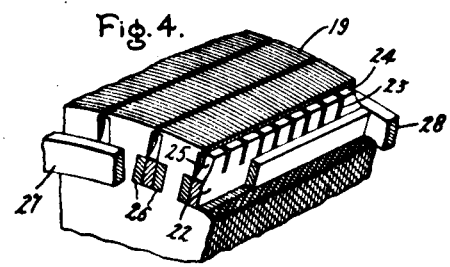
Figure 5:
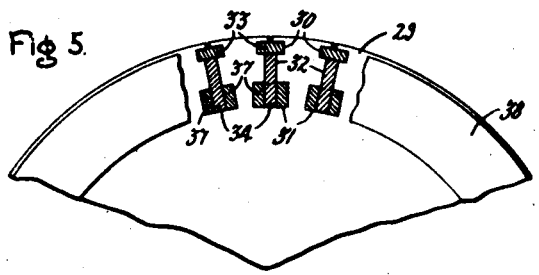
Figure 6:
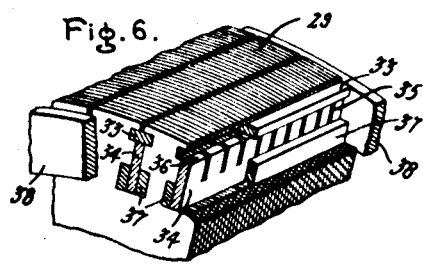
Figure 7:
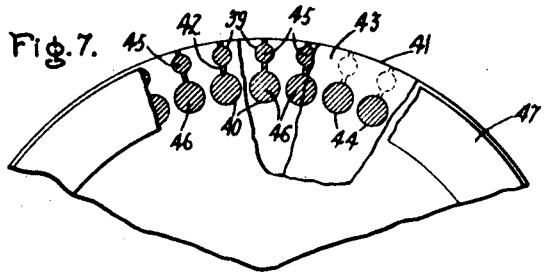
Figure 8:
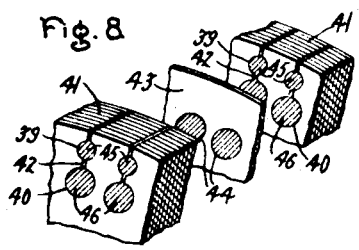
Figure 9:
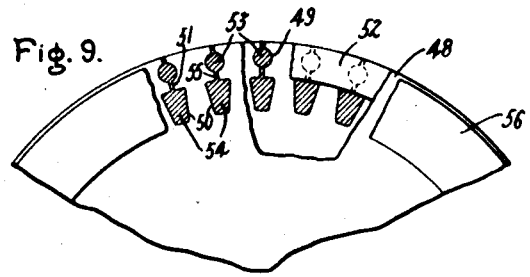
Figure 10:
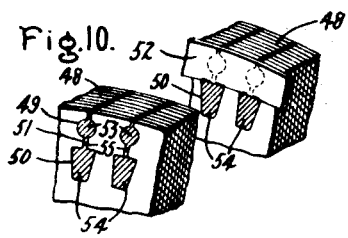

In the drawing, Fig. 1 is an end view of a part of a dynamoelectric machine rotatable member embodying my invention, partly broken away to illustrate the relative arrangement of the winding; Fig. 2 is a partial side view of the rotatable member illustrated in Fig. 1; Fig. 3 is an end view of a part of a rotatable member of a dynamoelectric machine, partly broken away to illustrate a modification of my invention; Fig. 4 is a perspective view of a part of the arrangement shown in Fig. 3; Fig. 5 is an end view of a part of a rotatable member of a dynamoelectric machine, partly broken away to illustrate a further modification of my invention; Fig. 6 is a perspective view of a part of the modification of my invention shown in Fig. 5; Fig. 7 is an end view of a part of the rotatable member of a dynamoelectric machine, partly broken away to illustrate a still further modification of my invention; Fig. 8 is an exploded perspective view of a part of the arrangement shown in Fig. 7; Fig. 9 is an end view of a part of the rotatable member of the dynamoelectric machine, partly broken away to illustrate another modification of my invention; and Fig. 10 is an exploded perspective view of a part of the arrangement shown in Fig. 9.

Referring to the drawing, I have shown in Fig. 1 the rotatable member of a dynamoelectric machine provided with a core formed of a plurality of laminations 10 of magnetic material having a plurality of winding slots formed therein adjacent the outer peripheral edge thereof. These winding slots are of the multiple section type and include an outer section 11 of relatively small area and an inner relatively larger section 12, which is displaced out of radial alignment with the outer section of each slot. A small relatively narrow interconnecting section or neck 13 extends angularly between the inner and outer sections of each slot and connects them together. The laminations 10 are assembled with the inner sections of the winding slots in registry so as to provide continuous inner slot sections longitudinally through the core.

Multiple section conductor squirrel cage windings have been made in the past of separate conductors and of cast connected conductors. Windings of this type made of separate conductors can be provided with conductors having any desired electrical resistance in the different sections of the winding in order to provide the desired starting and running characteristics to the machine. Windings of the cast connected conductor type generally do not afford this flexibility of design and choice of conductor resistance but lend themselves more readily to ease of manufacture on a production basis. In making cast multiple section conductor squirrel cage windings, the resistance of the outer section of the conductors in each slot has been varied by varying the size of this section of the slot, but the resistance of this section is limited to the resistance of a section of conductor which can be cast successfully, and the size of a conductor must be such as to insure a uniform flow of molten material into this section of the slot. This limits the higher value of the resistance of the outer small conductor section, and I have found that the resistance of this small outer conductor section of a multiple section conductor winding can be varied as desired in cast windings by interrupting the continuity of the electrical conductivity of this section of the conductor longitudinally through the core. In the arrangement shown in Fig. 1, the inner and outer conductor slot sections of each slot are displaced out of radial alignment so that the outer conductor section is not in radial alignment with the inner conductor section of any slot about the periphery of the lamination. With such an arrangement, the outer small conductor slot section may be interrupted longitudinally of the core by reversing at least one of the laminations with respect to the remaining laminations in the core and arranging all of the relatively large inner conductor slot sections in registry longitudinally of the core. The arrangement of the slots of such a reverse lamination in indicated in dotted lines in Fig. 1. As can be seen from this figure, the outer small conductor slot section 11 and the interconnecting slot section 13 of each slot are arranged on the opposite side of the radial center of the inner slot section 12 in the reversed lamination from that of the other laminations in the core, and this effectively interrupts these portions of the slots longitudinally through the core except for relatively small slot sections 14 which may be formed at the intersection of the reversely arranged interconnecting slot or neck sections. In certain cases the operation of the machine may be improved further by reversing a plurality of laminations at spaced apart intervals longitudinally through the core to provide a plurality of longitudinally discontinuous outer sections and interconnecting sections. A still further modification of this same construction may be obtained by arranging a plurality of laminations into a group having all of the slot sections of all of the laminations extending in the same direction within the group. A plurality of these groups of laminations is then arranged in alternately reversed relation, as shown in Fig. 2, so that the relatively narrow interconnecting section or neck 13 and the outer small section 11 extend on the opposite side of the radial center of the large slot section 12 in different adjacent groups of laminations. With such an arrangement, the interconnecting section 13 and the outer small slot section 11 is continuous through each group of laminations and is discontinuous and interrupted longitudinally through the core of the machine. Fig. 1 also represents an end view of the arrangement shown in Fig. 2 wherein the outer small slot section and the interconnecting section shown in dotted lines represents the arrangement of the group of laminations arranged in reverse order with respect to the group of laminations shown in full lines in this figure. A cast winding is formed in the core and is made to conform to the respective slot sections thereof, so that the small outer conductor sections provide a relatively high resistance element 15, and the large inner conductor sections of each slot provides a relatively low resistance conductor section 16. A relatively smaller conductor section than the outer conductor section 15 is formed in the longitudinally continuous slot sections 14 intermediate the inner and outer slot sections and extends continuously longitudinally of the core. These smallest conductor sections are of relatively higher resistance than the small conductor sections 15, as their cross sectional area is smaller than these outer conductor sections, and the number of these smallest conductor sections may be varied by varying the relative circumferential or radial alignment displacement between the inner and outer conductor slot sections. This cast winding may be made of any suitable electrically conductive material, such as aluminum or copper, and the outer ends of the conductors in the core slots are connected together by short circuiting end rings 17 and 18. The outer relatively high resistance conductor section 15 also may be made of a material having a higher electrical resistance than the material of the larger inner conductor section 16. This construction provides a rotor which has substantially the starting characteristics of a true multiple squirrel cage winding, that is, one in which there is no connecting conductor between the inner and outer conductor sections of a multiple conductor winding and gives a desired high starting torque obtainable with this type winding and also provides a higher maximum torque and lower full load slip than a comparable true double squirrel cage winding and is comparable to that obtainable in a single section slot machine. Furthermore, the resistance of the outer high resistance slot section may be varied as desired by varying the number of reversely arranged laminations which provide interruptions in the longitudinal continuity of the outer conductor section or by varying the number and size of the reversely arranged groups of laminations. The desirable characteristics obtainable by these arrangements may be explained by the fact that during starting of such a machine, the current in the motor is substantially at line frequency and substantially no current flows through the interrupted outer conductor section and the interconnecting narrow slot between the inner and outer sections since these are substantially discontinuous longitudinally of the rotor. Under running conditions, in the range from maximum torque to synchronous speed the frequency of the rotor currents is relatively low and the current is distributed substantially uniformly throughout the entire section of conductor in the winding slots resulting in improved torque and slip characteristics.

Another embodiment of my improved dynamoelectric machine rotatable member utilizing this type of winding may be made from individual conductors as shown in Figs. 3 and 4. In this arrangement as in the arrangment shown in Figs 1 and 2, I utilize conductors wherein the resistance of the outer small conductor section is varied by interrupting the longitudinal continuity of this portion of the conductor through the core. A plurality of laminations 19 of magnetic material are assembled to form the core of a rotatable member of a dynamoelectric machine and are provided with a plurality of multiple section winding slots of the open slot type having a relatively small outer slot section 20 and a relatively larger inner slot section 21 in direct communication with the outer section 20. These slots are arranged at substantially uniformly spaced apart intervals about the outer peripheral edge of each lamination, and the laminations are assembled with these slots in axial registry providing continuous slot sections longitudinally through the core. Separate bar conductors 22 having a depth substantially equal to the depth of the combined inner and outer slot sections 20 and 21 and a width substantially that of the outer relatively small sections 20 are inserted into the slots and extend continuously longitudinally through the core. The outer portion of each of these bar conductors 22 is provided with a plurality of slots or grooves 23 extending from the outer edge 24 transversely across the conductor to a depth substantially equal to the depth of the relatively narrow slot sections 20. The outer ends of these bar conductors 22 are cut away adjacent the upper outer corners thereof, as shown at 25, to a depth substantially equal to the depth of the relatively narrow outer slot section 20. Additional bar conductors 26 are arranged on each side of the conductors 22 in the relatively large inner slot sections 21 of the multiple section slots. This provides an electrically conductive section of relatively large area in the inner slot sections 21 of the multiple conductor slots and, therefore, this portion of the winding is of a relatively lower resistance than the conductor in the outer slot sections 20. Furthermore, since the outer conductor section is interrupted longitudinally of the core, its resistance is further increased. The relative resistance of the inner and outer conductor sections may be varied further by forming the relatively deep bar conductor 22 of relatively higher electrical resistance material than the conductors 26. Furthermore, since the outer slot section 20 is relatively narrow with respect to the inner slot section 21, it provides a magnetic bridge effect about the inner slot section 21, so that the inductance of a conductor section in the relatively larger slot is higher than the inductance of the outer conductor section. In order to complete the winding, the ends of the conductors in the relatively large conductor slot sections 21 are interconnected by short circuiting end rings 27 and 28 which extend about the outer laminations of the core. The operating characteristics of this construction are similar to those of the machine element shown in Figs. 1 and 2, and the starting characteristics of this winding may be varied as desired by varying the number of slots or grooves 25 which are formed in that portion of the conductor bar 22 which extends through the relatively small outer slot section 20.

A further modification of my improved dynamoelectric machine rotatable member is illustrated in Figs. 5 and 6 and is provided with a core formed of a plurality of laminations 29 of magnetic material. These laminations are formed with a plurality of multiple section winding slots including an outer relatively small slot section 30, a relatively large inner slot section 31 and a relatively narrow interconnecting section or neck 32 extending between the outer slot section 30 and inner slot section 31. A plurality of these winding slots is arranged adjacent the peripheral edge of the laminations 29, and these laminations are assembled with the slots in axial registry to provide continuous slots longitudinally through the core. A winding is arranged in these conductor slots and includes an outer conductor 33 formed of a relatively high electric resistance conductor bar which conforms substantially to the outer slot section 30. A second relatively deep bar conductor 34 is arranged within the interconnecting slot section 32 and extends into the relatively large conductor slot section 31. In order to increase the resistance of this conductor through the portion thereof which extends into the interconnecting slot connection 32, I provide a plurality of transversely extending grooves or slots 35 which extend from the outer edge 36 thereof to a depth substantially equal to the depth of the interconnecting section 32 as is more clearly shown in Fig. 6. Additional bar conductors 37 are arranged on each side of the conductors 34 in the relatively large inner slot section and extend continuously longitudinally through the core. This provides a winding having a relatively high resistance small section outer conductor, a relatively large section low resistance inner conductor, and a small section interconnecting the inner and outer conductor sections which is interrupted longitudinally through the core so as to increase the resistance thereof. Furthermore, since the sides of the slot adjacent the interconnecting section 32 extend inwardly about the inner conductor section 31, the inductance of the conductors in the inner slot section 31 is relatively higher than the inductance of the outer conductor 33. The relative resistance of the conductor in the outer slot section 30 and the resistance of the conductors in the inner slot section 31 may be further varied by using materials of different resistances for the conductors in these different sections. Short-circuiting end rings 38 are arranged adjacent the outer laminations of the core and are electrically connected to all of the conductors 33, 34, and 37 in a suitable manner as by welding, brazing, soldering, or riveting. These end rings short circuit all of the conductors in this rotatable member and provide a complete winding which has substantially the same operating characteristics as the rotatable member disclosed in Figs. 1 and 2.

Figs. 7 and 8 illustrate another modification of my invention, wherein a rotatable member for a dynamo-electric machine is provided with a multiple section winding slot of the open slot type which includes an outer relatively small slot section 39 and a relatively larger inner slot section 40 formed in a plurality of laminations 41 of magnetic material. In this arrangement certain of the laminations are provided with inner and outer conductor slot sections which are interconnected by a relatively narrow section or neck 42 and others of the laminations 43 are formed without outer conductor slot sections or interconnecting slot sections. These laminations are provided with only relatively large conductor slot sections 44 which correspond in size and arrangement to the conductor slot sections 40 of the laminations 41. The laminations having multiple slot sections are assembled with the inner and outer slot sections in registry to provide continuous slot sections longitudinally therethrough and are arranged into groups between which is arranged at least one of the laminations 43 with the slots 44 thereof in registry with the inner conductor slots 40 of the laminations 41. In forming a core, I provide at least one of the laminations 43 intermediate the ends of the core so as to interrupt the longitudinal continuity through the core of the relatively small outer conductor slots 39 and the interconnecting slot sections 42. Preferably, I arrange the laminations in a plurality of groups having inner and outer conductor slot sections and provide a lamination 43 without outer slot section intermediate each group. In this manner a plurality of outer conductor sections are formed which extend continuously longitudinally through each group of laminations, and these outer slot sections are discontinuous longitudinally through the core of the machine element. As in the arrangement shown in Fig. 1, I provide a cast squirrel cage winding in the winding slots to conform to the respective sections thereof. The winding thus formed includes outer relatively high resistance small conductor sections 45 and inner relatively low resistance large conductor sections 46. The ends of these conductor sections are interconnected by short-circuiting end rings 47 arranged about the outer laminations of the core to provide a complete winding. The operating characteristics of this machine are very similar to those of the machine element shown in Figs. 1 and 2, and the starting characteristics thereof may be varied as desired by varying the resistance of the outer connections 45 by changing the number of laminations 43 which interrupt the longitudinal continuity of these outer conductors.

Figs. 9 and 10 illustrate a still further modification of my invention wherein a rotatable member for a dynamoelectric machine is provided with a core of magnetic material formed of laminations 48 all of which are provided with multiple-section winding slots. Each of these slots includes an outer relatively small slot section 49 and an inner relatively large slot section 50 which are interconnected by a relatively narrow section or neck 51. The laminations 48 are assembled to form the core with the outer conductor sections 49 and the inner conductor section 50 in registry to provide substantially continuous slot sections longitudinally through the core. Intermediate the ends of the core I arrange a substantially non-magnetic, electrically insulating or high resistance element in the form of a circumferentially extending narrow ring or strip 52 arranged to interrupt the continuity longitudinally through the core of the outer small slot section 49 and the interconnecting slot section 51. Preferably, I arrange the laminations in a plurality of groups between which the ring elements 52 are arranged as shown in Fig. 10. A cast squirrel-cage winding is formed in the winding slots of the core to conform substantially to the respective sections thereof and is made of any suitable electric conducting material, such as aluminum or copper. This provides an outer relatively small, high resistance conductor section 53, which is discontinuous longitudinally through the core, as its continuity is interrupted by the ring element 52. An inner relatively large conductor section 54 of lower resistance is formed in the inner slot section 50 and is electrically connected to the outer conductors 53 by a relatively narrow conductor 55 formed in the interconnecting slot section 51. The resistance of the outer conductor 53 may be varied as desired by varying the interruptions of the longitudinal continuity thereof by varying the number and arrangement of the insulating ring elements 52 between groups of laminations forming the core. The outer conductor section 53 also may be made of a higher resistance material than the inner conductor sections 54 to increase further the starting torque of the machine. In order to complete the winding, short-circuiting end rings 56 are cast integral with the ends of the winding conductors 53, 54, and 55 at each end of the winding. The operating characteristics of this construction are substantially the same as those of the machine element shown in Figs. 1, 2, 7 and 8.

While I have illustrated and described particular embodiments of my invention as applied to open slot types of cores, modifications thereof will occur to those skilled in the art. I desire it to be understood therefore that my invention is not to be limited to the particular arrangements disclosed and I intend in the appended claims to cover all modifications which do not depart from the spirit and scope of my invention.

What I claim as new and desire to secure by Letters Patent of the United States is:

1. A member for a dynamoelectric machine including a core, said core having laminations with winding slots formed as multiple section conductor slots having a relatively small outer conductor section and a relatively large inner conductor section, other laminations having only relatively large inner conductor section slots corresponding substantially to said inner slot sections of said first-mentioned laminations, said laminations being arranged to provide continuous inner conductor slot sections longitudinally through said core, means including said other laminations arranged between said first-mentioned laminations for interrupting the continuity longitudinally through said core of said outer slot section of each slot, a winding having conductors in said slots arranged to conform to the respective sections thereof, and means for connecting together said conductors to complete said winding.

2. A member for a dynamoelectric machine including a core having laminations with winding slots formed therein, relatively small section outer conductors and relatively large section inner conductors in said slots, said inner conductors being continuous longitudinally through said core, means including a plurality of elements arranged between different groups of said laminations for providing a plurality of longitudinally interrupted outer conductor sections in each slot longitudinally through said core, and means for connecting together said conductors to complete said winding.

3. A member for a dynamoelectric machine including a core having laminations with winding slots formed therein, relatively small section outer conductors and relatively large section inner conductors in said slots, said laminations being arranged to provide continuous inner and outer conductor slot sections longitudinally through said core, means including a high resistance element arranged between certain of said laminations for interrupting the continuity longitudinally through said core of said outer conductors in each of said slots, and means for connecting together said conductors to complete said winding.

4. A member for a dynamoelectric machine including a core formed of laminations substantially all of which are provided with winding slots formed as multiple conductor section slots having relatively small outer conductor slot sections and relatively large inner conductor slot sections, inner conductors in said slots continuous longitudinally through said core, means including the construction and arrangement of said laminations for interrupting the continuity longitudinally through said core of said outer slot section of each slot, outer conductors in said slots arranged to conform to the respective interrupted sections thereof, and means for connecting together said conductors to complete said winding.

5. A member for a dynamoelectric machine including a core formed of laminations substantially all of which are provided with winding slots formed as multiple conductor section slots having relatively small outer conductor slot sections and relatively large inner conductor slot sections, inner conductors in said slots continuous longitudinally through said core, means including the construction of at least one of said laminations for interrupting the continuity longitudinally through said core of said outer slot section of each slot, outer conductors in said slots arranged to conform to the respective interrupted sections thereof and connected intermediate the ends thereof to said large section conductors, and means for connecting together said conductors to complete said winding.

6. A member for a dynamoelectric machine including a core formed of laminations substantially all of which are provided with winding slots formed as multiple conductor section slots having relatively small outer conductor slot sections and relatively larger inner conductor slot sections, large section inner conductors in said slots continuous longitudinally through said core, means including the arrangement of at least one of said laminations without an outer conductor slot section for interrupting the continuity longitudinally through said core of said outer slot section of each slot, outer conductors in said slots arranged to conform to the respective interrupted sections thereof, and means for connecting together said conductors to complete said winding.

7. A member for a dynamoelectric machine including a core formed of laminations substantially all of which are provided with winding slots formed as multiple conductor section slots having relatively small outer conductor slot sections and relatively larger inner conductor slot sections radially out of alignment with said small conductor slot sections, inner conductors in said slots continuous longitudinally through said core, means including the arrangement of said laminations in groups for interrupting the continuity longitudinally through said core of said outer slot section of each slot, outer conductors in said slots arranged to conform to the respective interrupted sections thereof, and means for connecting together said conductors to complete said winding.

8. A member for a dynamoelectric machine including an element of magnetic material comprising laminations having winding slots formed therein, substantially all of said winding slots being formed as multiple conductor section slots including relatively small conductor sections and relatively large conductor sections, said small conductor section and said large conductor section of each slot being arranged displaced out of radial alignment, at least one of said laminations being arranged with the radial alignment displacement of said large conductor section with respect to said small conductor section displaced in the opposite direction from the displacement thereof in the other laminations, large longitudinally continuous inner conductors in said large conductor section of said slots and longitudinally discontinuous small conductors in said small conductor sections of said slots, and means for connecting together said conductors to complete said winding.

9. A member for a dynamoelectric machine including an element of magnetic material comprising laminations having winding slots formed therein, substantially all of said winding slots being formed as multiple conductor section slots including relatively small conductor sections and relatively large conductor sections, said small conductor section and said large conductor section of each slot being arranged displaced out of radial alignment with each other, said laminations being arranged in groups with the radial alignment displacement of said large conductor sections with respect to said small conductor sections of said winding slots displaced in opposite directions in different groups of laminations, longitudinally continuous large conductors in said large conductor slot sections and substantially longitudinally discontinuous small section conductors in said small conductor slot sections, and means for connecting together said conductors to complete said winding.

10. A member for a dynamoelectric machine including an element of magnetic material comprising laminations having winding slots formed therein, substantially all of said winding slots being formed as multiple conductor section slots each including a relatively small conductor section and a relatively larger conductor section with a relatively narrow connecting slot section extending therebetween, said small conductor slot section and said large conductor section of each slot being arranged displaced out of radial alignment, said laminations being arranged in groups with the radial alignment displacement of said large conductor sections with respect to said small conductor sections of said winding slots displaced in opposite directions in different groups of laminations, longitudinally continuous large section conductors in said slots and substantially longitudinally discontinuous small section conductors in said slots, said arrangement of said radial alignment displacement of said large conductor slot sections with respect to said small conductor slot sections providing an overlapping of said connecting slot sections of said different groups of laminations forming continuous conductor sections longitudinally through said element of relatively smaller section than said small conductor sections, conductors in said connecting slot sections arranged to conform substantially to the respective sections thereof, and means for connecting together said conductors to complete said winding.

11. A member for a dynamoelectric machine including a core having laminations with winding slots formed as multiple conductor section slots having relatively small section outer conductor slot sections and relatively large inner conductor slot sections, longitudinally continuous inner conductors in said slots, means including at least one lamination for interrupting the continuity longitudinally through said core of said outer slot section of each slot, longitudinally interrupted outer conductors in said outer slot sections, and means for connecting together said conductors to complete said winding.

CHARLES C. LEADER.